United States Patent Office 3,314,313
Patented Apr. 18, 1967

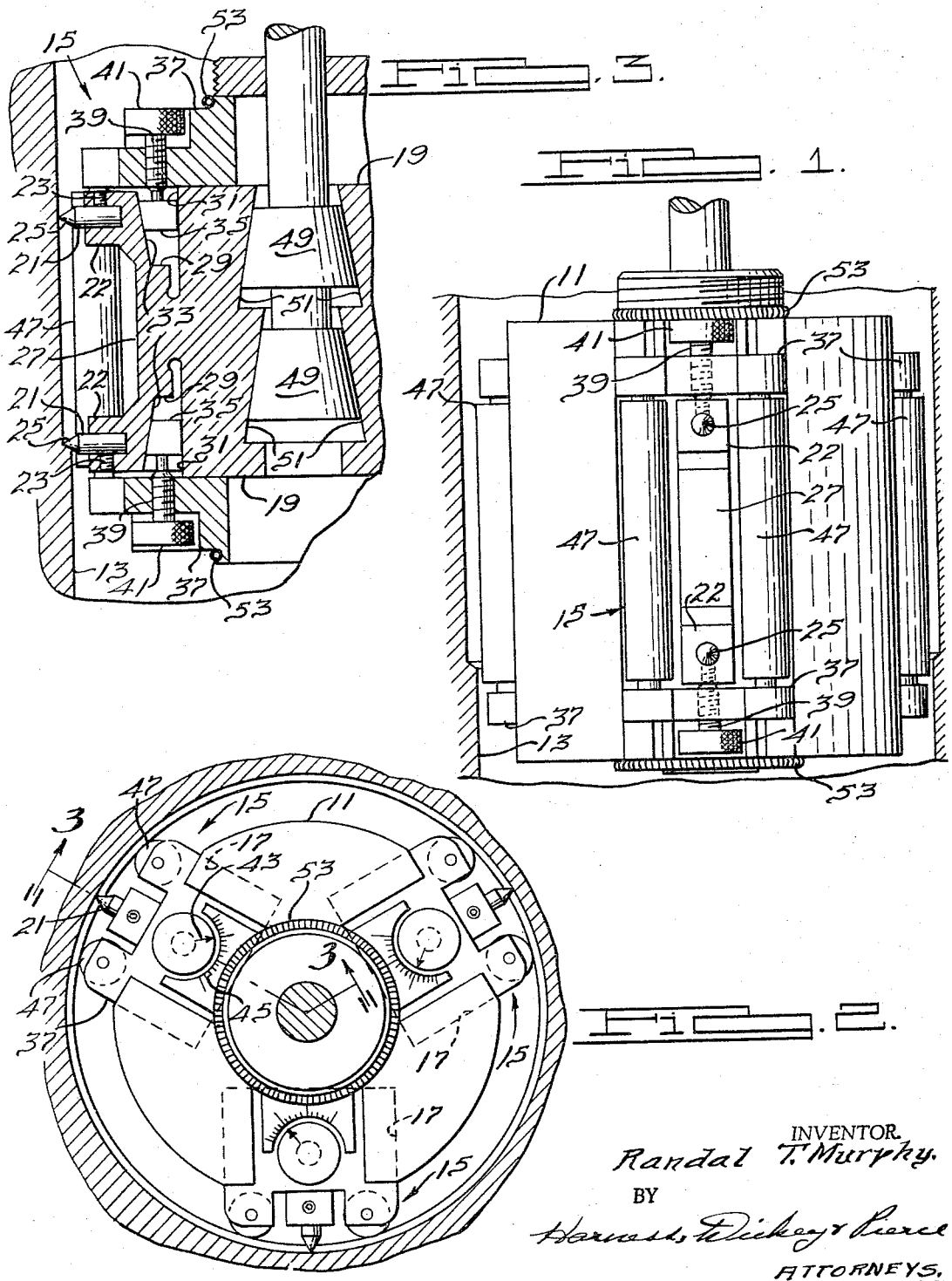

3,314,313
EXPANDABLE BORING TOOL
Randal T. Murphy, Royal Oak, Mich., assignor to Micromatic Hone Corporation, Detroit, Mich., a corporation of Michigan
Filed Aug. 27, 1964, Ser. No. 392,443
7 Claims. (Cl. 77—58)

This invention relates generally to boring tools, and particularly to expandable rotary tools adapted to enlarge and finish cylindrical bores.

In metal bore enlarging operations, it is conventional to size the bore approximately to the desired diameter by using a tool capable of rapid metal stock removal, and then to finish the bore to size removing only a relatively small amount of stock. Depending then on the bore geometry, or the degree of roundness and smoothness desired in the particular workpiece bore, an additional finishing operation might be employed, such as, for example, a honing operation. While the surface finishes achieved in these machining operations are generally satisfactory, quite often bore finishing operations of this class required two and sometimes three separate tooling stations along with a corresponding number of tool assemblies.

The present invention contemplates the provision of an improved boring tool assembly capable of performing a number of bore enlarging and finishing operations at a single tool station with a single tool assembly. Briefly, this invention includes an expandable rotary boring tool assembly adapted to remove stock at a relatively rapid rate and, after a minor adjustment, will finish the bore by removing a relatively small amount of stock and will provide an accurate bore surface finish. The boring tools used in the device of the present invention are constructed from a relatively hard substance to facilitate both long life and accurate dimensions in the boring operations. Also, in using these relatively hard tools and by removing a relatively small amount of stock, the bore surface geometrically achieved in the finish boring operation may approach those usually reserved to honing operations.

An accurate gauging device is provided on the tool assembly of the present invention to provide a very close control for the depth of stock removal which occurs at each tool pass. Also, a means is provided to simply and accurately adjust the depth of cut for the boring tools as well as to compensate for tool wear after extended use.

It is an object, therefore, of the present invention to provide an improved expandable boring tool assembly capable of performing a variety of boring operations.

It is a further object of the present invention to provide an improved boring tool assembly of the above type capable of producing a geometrically accurate controlled size bore.

It is a further object of the present invention to provide a boring tool assembly of the above type having an improved stock removal gauging assembly.

It is a further object of the present invention to provide an improved boring tool assembly of the above type having a tool adjustment mounting.

It is a further object of the present invention to provide an improved boring tool assembly of the above type adapted for use in producing an accurate bore surface finish on a variety of metals.

It is still a further object of the present invention to provide an improved boring tool assembly of the above type which is relatively inexpensive, rugged in construction and reliable in operation.

These and other objects and advantages of the present invention will become more apparent from the following detailed description taken in conjunction with the drawings in which:

FIGURE 1 is a view in elevation of a boring tool head assembly embodying the principles of the present invention;

FIG. 2 is an end view of the structure of FIG. 1; and

FIG. 3 is a fragmentary sectional view of the structure of FIG. 2, taken along the line 3—3 thereof.

Referring now more specifically to the drawings, a boring head 11 is adapted to be reciprocated and rotated within a workpiece bore 13 by a conventional reciprocating and rotary drive device (not shown). The drive device may in turn be connected to the head 11 through a screw 14. Carried by the boring head for movement therewith are a plurality of cutter assemblies generally designated 15, and while three of these cutter assemblies are illustrated, it is to be understood that this number may vary according to particular desires. Further, since each of the cutter assemblies is identical, a description of one will suffice here.

Each cutter assembly 15 is positioned within an axially extending slot 17 formed in boring head 11 and is seen to include an elongate cutter holder 19 constructed from steel or other suitable material. A cutting tool 21 is fixed, one each at an end portion 22 of the cutter holder, by suitable means such as set screws 23. These cutting tools may be constructed from a relatively hard abrasive substance such as diamond or ceramic, and each may be sharpened to a suitable point 25.

As shown in FIG. 3, each cutter holder 19 is recessed as at 27 between end portions 22 while a pair of wedge shaped slots 29 are formed one each beneath each end portion 22. Each of slots 29 is defined by a generally axially extending lower wall 31 and a downwardly and inwardly tapering upper wall 33 and is adapted to receive a wedge shaped block 35. A pair of end plates 37, snugly received within each slot 17, are fixed one adjacent each end of the cutter holder by suitable means such as screws (not shown). Each plate 37 threadedly receives an adjustment screw 39 each of which is rotatably received within an adjacent one of the wedge blocks. Thus, as adjustment screws 39 are threaded axially inwardly relative to the end plates, wedge blocks 35 will be moved inwardly of slots 29 and will deflect end portions 22 of the cutter holders radially outwardly. Recessed portion 27 formed in the cutter holder permits this outward deflection of the cutter holder end portions. To accurately determine the amount of outward deflection of end portions 22 and therefore tools 21, each of the adjustment screws 39 may be formed with an enlarged head portion 41 provided with an indicator 43 thereon. An adjacent portion of each of plates 37 may be formed with a suitably calibrated scale 45. Thus, as the adjustment screw is rotated and moved axially, one can determine the radial position of each tool 21 by reading scale 45 at the point of indication.

Each pair of plates 37 rotatably carries a pair of generally cylindrical rollers 47, which extend generally axially of the boring head. Each of the rollers is constructed from a relatively hard wear resisting substance such as tungsten carbide. As shown, these rollers are positioned one on either side of each cutter holder 19 for rolling engagement with the bore wall during rotation of the boring head therein. Since each pair of plates 37 is fixed to a respective cutter holder 19, the extent to which cutters 21 protrude radially outwardly beyond rollers 47 will determine the depth of cut and therefore the rate of stock removal at each tool pass. Thus, not only will adjustment screws 39 provide a rapid and accurate adjustment for the depth of cut for each of the tools, but compensation for tool wear may be made thereby to maintain a predetermined rate of stock removal.

Once the tools are adjusted for the desired depth of cut, the boring head is ready to be cycled in the conventional manner, axially and rotatably within the workpiece bore. As the boring head is cycled, a conventional pull-cone assembly having a pair of cones 49 positioned to engage complementary tapered surfaces 51 formed on the cutter holders is pressured axially relative thereto in the usual manner to expand the cutter holders radially outwardly until rollers 47 engage the bore wall. The cutter holders are each maintained with their tapered surfaces in engagement with cones 49 by a conventional pair of garter springs 53 which also serve to collapse the cutter holders inwardly upon completion of the boring cycle.

In performing a typical bore finishing operation using the tool assembly of the present invention, the tools would first be set for relatively rapid stock removal. This is accomplished by adjusting the screws 39 so that the tools extend radially beyond rollers 47 a distance equal to the desired depth of cut. The indicator 43, read in conjunction with the scale 45, will facilitate accurate tool adjustment. The boring tool assembly is then cycled by rotation and reciprocation within the workpiece bore and the pull-cone assembly is activated to pressure the tools into cutting relation with the bore wall.

When the bore reaches a predetermined size, which may be determined by a suitable bore gauging device either manually or automatically, the tools may then be adjusted radially inwardly for a relatively small depth of cut. Again, the adjustment screws 39 will serve to set the degree of tool protrusion beyond the gauging rollers and the scale 45 is used for an accurate determination of this factor. The boring tool assembly is then cycled in exactly the same manner except that this time, the rate of stock removal is greatly decreased. A suitable bore gauging device may then be used to signal the completion of the boring operation in the conventional manner. Upon completion of the boring operation, the pull-cone assembly is retracted and the garter spring will collapse the tool assemblies inwardly to facilitate removal from the workpiece bore without marring the finished wall.

By using relatively hard abrasive tools and cycling the tool assembly in the manner set forth above, accurately dimensioned bores having smooth finishes are achieved approaching those usually reserved to two and three station boring and honing operations. This then not only serves to reduce tooling cost and factory space needed to effect these boring operations, but also results in a lowered cost per unit article to the consumer.

While a preferred embodiment has been illustrated and described in detail herein, various additions, substitutions, modifications and omissions may be made thereto without departing from the spirit of the invention as encompassed by the appended claims.

What is claimed is:

1. An expandable boring tool assembly including an elongate rotatable tool body having a plurality of cutter holders disposed thereon for rotation therewith, at least one cutting tool carried by each of said cutter holders and adapted to engage a bore wall during movement of said tool body therein, a pair of rollers mounted adjacent each said cutting tool, one on either side thereof, for rolling engagement with said bore wall and means for biasing each said cutter holder outwardly relative to said tool body.

2. An expandable boring tool assembly including an elongate tool body rotatable about a longitudinal axis thereof, at least one elongate cutter holder having a main portion carried by said tool body for rotation therewith and an integral end portion extending radially outwardly of said tool body, a wedge shaped opening formed between said cutter holder main and end portions, a wedge member within said opening adapted to be moved longitudinally thereof to deflect said end portion outwardly of said main portion, a cutting tool carried by said cutter holder at said end portion and adapted to engage a bore wall during movement of said tool body therein and means biasing said cutter holder outwardly of said tool body.

3. An expandable boring tool assembly including an elongate tool body rotatable about a longitudinal axis thereof, at least one elongate cutter holder having a main portion carried by said tool body for rotation therewith and an integral end portion extending radially outwardly of said tool body, a cutting tool carried by said cutter holder at said end portion and adapted to engage a bore wall during movement of said tool body therein, roller means carried by said main cutter holder and mounted adjacent each said cutting tool for rolling engagement with said bore wall during rotation of said tool body, means for deflecting said end portion away from said main portion and means biasing said cutter holder outwardly of said tool body.

4. An expandable boring tool assembly including an elongate tool body rotatable about a longitudinal axis thereof, at least one elongate cutter holder having a main portion carried by said tool body for rotation therewith and an intergral end portion extending radially outwardly of said tool body, a wedge shaped opening formed between said cutter holder main and end portions, a wedge member within said opening adapted to be moved longitudinally thereof to deflect said end portion outwardly of said main portion, a cutting tool carried by said cutter holder at said end portion and adapted to engage a bore wall during movement of said tool body therein, roller means carried by said main cutter holder and mounted adjacent each said cutting tool for rolling engagement with said bore wall during rotation of said tool body and means biasing said cutter holder outwardly of said tool body.

5. An expandable boring tool assembly including an elongate tool body rotatable about a longitudinal axis thereof, at least one elongate cutter holder having a main portion carried by said tool body for rotation therewith and an integral end portion extending radially outwardly of said tool body, a cutting tool carried by said tool holder end portion and adapted to engage a bore wall during movement of said tool body therein, plate means fixed to said cutter holder main portion for rotatably supporting a pair of rollers, one adjacent each side of said cutting tool, cutter adjustment means carried by said plate means and adapted to deflect said cutter carrier end portion outwardly of said main portion and indicator means for said adjustment means.

6. An expandable boring tool assembly including an elongate tool body rotatable about a longitudinal axis thereof, at least one elongate cutter holder having a main portion carried by said tool body for rotation therewith and a pair of spaced integral end portions extending radially outwardly of said tool body, a cutting tool carried by each said tool holder end portion and adapted to engage a bore wall during movement of said tool body therein, a pair of plates fixed to said cutter holder main portion at each end thereof for rotatably supporting a pair of rollers, one adjacent each side of each said cutting tool, cutter adjustment means carried by each said plate means and adapted to independently deflect each said cutter carrier end portion outwardly of said main portion and indicator means for said adjustment means.

7. An expandable boring tool assembly including an elongate tool body rotatable about a longitudinal axis thereof, at least one elongate cutter holder having a main portion carried by said tool body for rotation therewith and a pair of spaced end portions extending radially outwardly of said tool body, a wedge shaped opening formed between said main cutter holder portion and each of said end portions, a cutting tool carried by each said tool holder end portion and adapted to engage a bore wall during movement of said tool body therein, a pair of plates fixed to said cutter holder main portion at each end thereof for rotatably supporting a pair of rollers, one adjacent each side of each said cutting tool, cutter adjustment means including a screw threadedly carried by said plate means, a wedge carried by each said screw and positioned within each said wedge shaped opening and adapted to independently deflect each said cutter carrier end portion outwardly of said main portion and indicator means for said adjustment means.

References Cited by the Examiner
UNITED STATES PATENTS

| | | |
|---|---|---|
| 1,111,482 | 9/1914 | Massmann et al. |
| 1,674,863 | 6/1926 | Jennings. |
| 1,677,055 | 7/1928 | Simons _____ 77—58 |
| 2,725,222 | 11/1955 | Robbins et al. |
| 3,200,673 | 8/1965 | Pfeifer. |

WILLIAM W. DYER, JR., *Primary Examiner.*

GERALD A. DOST, *Examiner.*